United States Patent Office 3,380,800
Patented Apr. 30, 1968

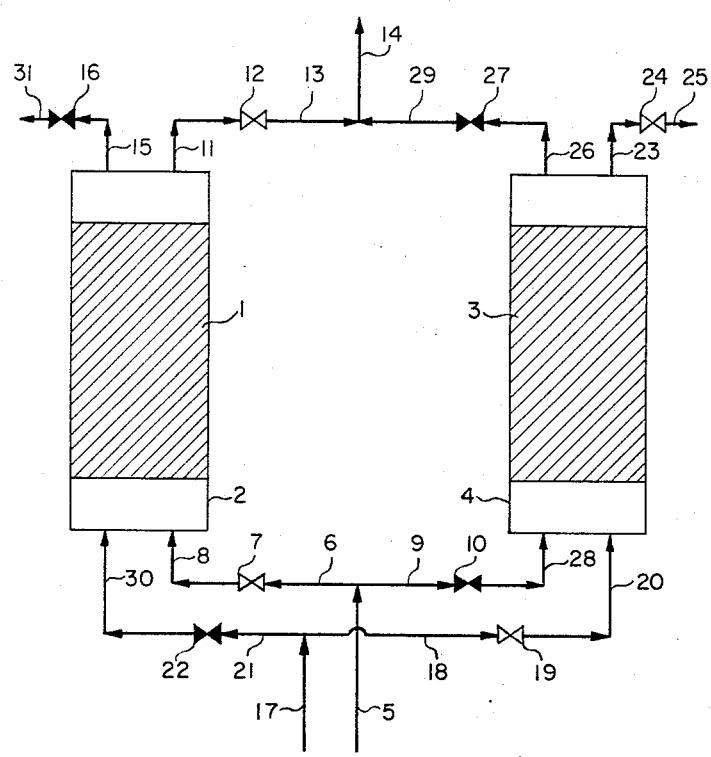

3,380,800
REMOVAL OF CARBON MONOXIDE FROM GAS MIXTURES
Jerome H. Marten, Nixon, N.J., assignor to Chemical Construction Corporation, New York, N.Y., a corporation of Delaware
Filed July 12, 1963, Ser. No. 294,629
7 Claims. (Cl. 23—2)

ABSTRACT OF THE DISCLOSURE

Carbon monoxide is selectively oxidized to carbon dioxide in a hydrogen-nitrogen (ammonia synthesis) gas stream, without concomitant oxidation of hydrogen, by contacting the gas stream with a bed of solid cupric oxide at a temperature below 400° F. The cupric oxide is thus reduced to cuprous oxide. The resultant gas stream contains hydrogen, nitrogen, carbon dioxide and less than 5 p.p.m. of carbon monoxide, and is suitable for ammonia synthesis after carbon dioxide removal. The resultant bed of cuprous oxide is regenerated by terminating the flow of ammonia synthesis gas and passing a stream of oxygen-containing gas such as air through the bed.

---

This invention relates to the purification of gas streams by the selective oxidation of the carbon monoxide component contained in a gas mixture which may also contain an additional reducing gas component, such as ammonia synthesis gas. It has been determined that cupric oxide is an effective and selective oxidizing agent for carbon monoxide in a mixed gas stream, especially a gas stream containing another reducing gas component such as hydrogen.

Various methods have been proposed for the elimination of carbon monoxide from mixed gas streams. Two of the main approaches involve catalytic oxidation to carbon dioxide, and absorption of the carbon monoxide in a liquid scrubbing solution. Typical processes involving catalytic oxidation of carbon monoxide are described in U.S. Patent No. 2,980,743 and British Patent No. 882,536. In these procedures, a proportion of oxygen is provided in the gas stream, which contains an additional reducing gas component besides carbon monoxide. The mixed gas stream is then passed in contact with a metal of the platinum group, such as platinum or rhodium. The carbon monoxide is preferentially oxidized to carbon dioxide, which may be subsequently removed by known methods.

The removal of carbon monoxide from a gas stream by scrubbing with a liquid absorbent solution usually employs ammoniacal cuprous chloride solution as the absorbent agent. A process of this nature, involving an improvement in the regeneration procedure is described in U.S. Patent No. 2,047,550.

Still another method for removal of carbon monoxide from a gas stream is applicable in cases where hydrogen is a component of the gas stream. In this approach, the carbon monoxide is catalytically reacted with the hydrogen to yield methane and water vapor. Thus, for example, in U.S. Patent No. 2,074,311 the reaction is carried out in the presence of a catalyst formed from a mixture of nickel, copper and thorium oxide.

These procedures of the prior art are of limited advantage and possess various drawbacks. Thus, the addition of oxygen and subsequent catalytic oxidation of the gas stream in the presence of a platinum catalyst generally leads to the concomitant oxidation of a portion of the other reducing gas component present in the gas stream. Use of an ammoniacal cuprous chloride solution requires expensive equipment and steam for regeneration of the laden solution, and in addition a substantial proportion of other gas components such as carbon dioxide and oxygen may be absorbed together with the carbon monoxide. Catalytic methanation of carbon monoxide by reaction with hydrogen is also objectionable particularly in the case of ammonia synthesis gas. In this case, the methane which is formed is an undesirable inert component in the synthesis gas stream which must be periodically purged from the synthesis loop leading to concomitant loss of ammonia synthesis gas. In addition, catalytic methanation also consumes a proportion of hydrogen, which thus represents a process loss of a valuable gas component.

In the present invention, carbon monoxide is eliminated from a mixed process gas stream, which may contain another reducing gas component such as hydrogen or a hydrocarbon such as ethylene, by contacting the gas stream with solid cupric oxide. The carbon monoxide is preferentially oxidized to carbon dioxide, while the cupric oxide is reduced to cuprous oxide. Alternate beds of cupric oxide are preferably provided, with one bed being on stream while the other bed is regenerated using air or oxygen. The cupric oxide is generally provided on a suitable carrier such as pumice.

The procedure of the present invention provides several advantages. The carbon monoxide is substantially completely converted to carbon dioxide, without requiring the introduction of gaseous oxygen or air into the gas stream. In addition, the conversion of carbon monoxide to carbon dioxide may be carried out in the presence of substantial proportions of carbon dioxide and hydrogen. Thus, the process of the present invention is readily applicable to the product gas stream from the catalytic water gas shift reaction. This reaction is not carried to complete conversion of carbon monoxide in practice, since an intermediate removal of carbon dioxide is required if complete conversion is to be attained by water gas shift reaction alone. In accordance with the present invention, the product gas stream from the water gas shift reaction containing a small proportion of unreacted carbon monoxide is passed in contact with cupric oxide, thus converting residual carbon monoxide to carbon dioxide. The subsequent removal of carbon dioxide by scrubbing the gas stream with aqueous absorbent solution containing dissolved potassium carbonate or monoethanolamine thus results in a complete purification of the gas stream. In addition, the process of the present invention is advantageous as contrasted to methanation, since inerts formation and hydrogen consumption are avoided.

It is an object of the present invention to eliminate carbon monoxide from mixed gas streams.

Another object is to preferentially oxidize carbon monoxide to carbon dioxide in a mixed gas stream containing another reducing gas component.

A further object is to remove carbon monoxide from crude ammonia synthesis gas containing carbon dioxide and hydrogen by selective oxidation.

An additional object is to oxidize carbon monoxide in a mixed gas stream by contact with cupric oxide.

These and other objects and advantages of the present invention will become evident from the description which follows. Referring to the figure, a preferred embodiment of the invention is presented, in which two beds of solid cupric oxide are provided, bed 1 in vessel 2 serving to oxidize carbon monoxide in a process gas stream while the other bed 3 in vessel 4 is being regenerated with air. Beds 1 and 3 preferably consist of solid cupric oxide deposited on a suitable carrier such as pumice.

The process gas stream 5, typically a crude ammonia synthesis gas stream containing hydrogen, nitrogen, carbon dioxide and up to 5% carbon monoxide, is obtained at a temperature which is preferably below 400° F. in order to provide optimum reaction conditions. Stream 5 passes via line 6, open valve 7 and line 8 into vessel 2. An alternate flow via line 9 is prevented by valve 10, which is shown in solid black to indicate that it is in the closed position in this phase of the processing sequence.

The process gas stream thus passes upwards through vessel 2 and in contact with cupric oxide bed 1. Oxidation of carbon monoxide in the gas stream takes place while in contact with bed 1, together with concomitant reduction of the cupric oxide to cuprous oxide. The resulting gas stream now leaves vessel 2 via line 11, typically containing less than 5 p.p.m. of carbon monoxide. The product gas stream next passes via open valve 12, lines 13 and 14 to further processing, such as carbon dioxide removal by scrubbing with aqueous absorbent solution. An alternate flow via line 15 is prevented by valve 16, which is closed in this phase of the process.

Simultaneously with the passage of process gas stream 5 through bed 1, a regenerating stream of oxygen-containing gas such as air is passed through bed 3, in order to re-oxidize cuprous oxide. Thus, air stream 17 is passed via line 18, open valve 19 and line 20 into vessel 4. An alternate flow of air via 21 is prevented by closed valve 22. The air stream rising through bed 3 serves to oxidize cuprous oxide to cupric oxide, and the residual air stream is removed from vessel 4 via line 23, and passed through open valve 24 to vent discharge via 25. An alternate flow of residual air via 26 is prevented by closed valve 27.

In the alternate phase of the cyclic process, the ammonia synthesis gas stream 5 is passed through bed 3 and the oxidizing air stream is passed through bed 1. In this case, valves 21, 10, 16 and 27 are opened and valves 7, 19, 12 and 24 are closed. The flow of stream 5 thus proceeds via line 9, valve 10 and line 28 to vessel 4. The process gas stream, substantially free of carbon monoxide, is withdrawn via line 26 and passed via valve 27 and line 29 to process usage via 14. The regenerating air stream 17 passes via line 21, valve 22 and line 30 to vessel 2, and is withdrawn via 15 and passed via valve 16 and line 31 to vent discharge.

Operating pressure is not a significant variable in the process of the present invention. Thus, any suitable pressure from atmospheric up to 5000 p.s.i.g. or higher may be employed in practice of the present invention.

Various alternatives within the scope of the present invention will occur to those skilled in the art. The activity of the cupric oxide may diminish at a rate faster than that of the re-oxidation during the regeneration period. In this case, a 3 or 4 bed system may be provided, with one bed serving for process usage in carbon monoxide oxidation while the other beds are being re-oxidized for succeeding usage periods.

It is evident that the process of the present invention may be carried out by means of a fluidized bed apparatus equipped with a solids takeoff for regeneration of the oxide.

The present invention is applicable in all plants requiring process gases with low content of carbon monoxide, however the process is especially applicable to the removal of carbon monoxide from process gas streams in ammonia and hydrogen plants.

I claim:
1. Process for the selective oxidation of carbon monoxide to carbon dioxide in a mixed gas stream produced at elevated temperature and principally containing hydrogen and nitrogen, said mixed gas stream being substantially free of uncombined oxygen, which comprises contacting the mixed gas stream with solid cupric oxide at said elevated temperature but below 400° F. without adding free oxygen to said mixed gas stream, whereby said cupric oxide is reduced to cuprous oxide and carbon monoxide is selectively oxidized to carbon dioxide without hydrogen oxidation, and recovering a product mixed gas stream principally containing hydrogen, nitrogen and carbon dioxide and substantially free of carbon monoxide, said product mixed gas stream containing carbon dioxide in the gaseous state derived from selective oxidation of carbon monoxide.

2. The process of claim 1, in which curous oxide is periodically re-oxidized to cupric oxide by terminating the flow of said mixed gas stream, and contacting said cuprous oxide with an oxygen-containing gas stream.

3. The process of claim 2, in which said oxygen-containing gas stream is air.

4. Process for the selective oxidation of carbon monoxide to carbon dioxide in a crude ammonia synthesis gas stream produced at elevated temperature and principally containing hydrogen, nitrogen, carbon dioxide and up to 5% carbon monoxide, said ammonia synthesis gas stream being substantially free of uncombined oxygen, which comprises contacting the mixed gas stream with solid cupric oxide at said elevated temperature but below 400° F. without adding free oxygen to said mixed gas stream, whereby said cupric oxide is reduced to cuprous oxide and carbon monoxide is selectively oxidized to carbon dioxide without hydrogen oxidation, and recovering a product ammonia synthesis gas stream principally containing hydrogen, nitrogen and carbon dioxide and containing less than 5 p.p.m. of carbon monoxide, said product ammonia synthesis gas stream containing carbon dioxide in the gaseous state derived from selective oxidation of carbon monoxide.

5. Process of claim 4, in which said cupric oxide is deposited on a pumice carrier.

6. The process of claim 4, in which cuprous oxide is periodically re-oxidized to cupric oxide by terminating the flow of said crude ammonia synthesis gas stream, and contacting said cuprous oxide with an oxygen-containing gas stream.

7. The process of claim 6, in which said oxygen-containing gas stream is air.

References Cited

UNITED STATES PATENTS

| 573,053 | 12/1896 | Thomson | 23—213 X |
|---|---|---|---|
| 984,605 | 2/1911 | Reichel et al. | 23—220 |
| 1,896,916 | 2/1933 | Perley | 23—3 |
| 3,206,414 | 9/1965 | Gunther | 23—2 |

FOREIGN PATENTS 129,743    7/1919    Great Britain.

OTHER REFERENCES

Mellor, "A Comprehensive Treatise on Inorganic and Theoretical Chemistry," Longmans, Green & Co., New York, N.Y., vol. 3, 1923, p. 137.

EARL C. THOMAS, *Primary Examiner.*